3,203,968
ION FLOTATION METHOD
Felix Sebba, Dept. of Chemistry, University of the Witwatersrand, Johannesburg, Transvaal, Republic of South Africa
No Drawing. Filed June 3, 1959, Ser. No. 818,501
7 Claims. (Cl. 260—429.1)

My invention relates to the recovery of ions from solution and more particularly to the recovery of inorganic ions from solution by contacting the ions with an ionic organic reagent to form insoluble reaction product and separating insoluble reaction product from the solution.

For many years flotation procedures have been used to recover various minerals from ores. Generally the flotation process consists of crushing the mineral containing ores; contacting the resulting finely ground mixtures of particles of ore gangue and mineral with flotation agents, frothing agents and other additives; contacting the treated mineral particles with air bubbles to buoy or lift the mineral to the surface and recovering the metal from the resulting froth.

I have now discovered a mineral recovery process where I can recover ions from solutions in the complete absence of undissolved mineral particles, as differentiated from ions, such as are recovered by the usual flotation processes, and ions from ore separation waters wherein the amount of solid mineral particles is so reduced that the amount of insoluble reaction product resulting from combination of inorganic ions with the collector comprises at least 5% and preferably at least 15% of the recovered product. I further prefer that the process be carried out in the absence of undissolved metal particles, though their presence is not detrimental. I can also vary the procedure of my process to recover surfactants from solutions, such as sewage and wash waters.

Generally my process consists of concurrently contacting cations or anions in solution together with mineral particles, if present, with bubbles and with anionic and cationic reagents, i.e. collectors, respectively to form insoluble products which are transported to the solvent surface by the rising bubbles and removed therefrom as a froth or scum.

Both nonmetallic and metallic inorganic ions can be recovered by my process. Nonmetallic ions which can be recovered by the process of my invention include the ions of silicic acid, polythionates, arsenic acid, thioarsenates, thioarsenites, fluorosilicic acid and boric acid. It is preferable that the nonmetallic ions be in the form of complex anions.

Either simple or complex metal ions can be recovered by use of my recovery process. These metals include the alkaline earth metals such as calcium, strontium and barium; the transition metals such as aluminum, manganese, chromium, gallium, germanium, molybdenum, tantalum, hafnium, tungsten, rhenium, osmium, palladium, copper, silver, gold and platinum; the rare earth metals, such as praseodymium, lanthanum, samarium, cerium, terbium, ytterbium and holmium; and the actinide series metals such as uranium, neptunium and thorium.

The metals may be present in solutions as simple cations or as complex anions. Examples of complex ions which may be recovered by my process include the anionic complex of uranium with sulfate ions; the chloroplatinic ion in water; the complex ions of cyanide with metals such as gold, silver, iron and cobalt; ionic complexes of ammonia with metals such as copper, zinc and silver; the complexes of fluoride ion with metals such as beryllium; the silicates and the miscellaneous complex ions such as the molybdate, vanadate and borate ions. I prefer to recover metal ions in my process.

The collectors untilized in the process of my invention are, generally speaking, the ionic surface-active collectors which are utiized in ore flotation procedures. These collectors must have at least one hydrophilic center of activity and at least one aerophilic center of activity. They must have an electrical charge which is opposite to the metal ion which it is desired to collect if the process is to be operative.

A surface-active anionic collector; i.e. a collector yielding, in aqueous solution, a surface-active ion bearing a negative charge, for example, a lauric acid soap; is used to remove a soluble metal cation from solution. Conversely, a surface-active cationic collector; i.e. a collector yielding, in aqueous solution, a surface-active ion bearing a positive charge, for example lauryl pyridinium chloride; is used when it is desired to remove a desired metal anion from solution.

Cationic collectors used in my novel process, for the most part, are compounds having an amine nitrogen. These compounds include alkyl, aryl and arylalkylamines and the corresponding amine and quaternary halogen salts. The arylamines include the picolines, pyridines, quinolines and their homologs and lower alkyl substituted analogs.

Examples of cationic collectors which will react with complex metal anions and nonmetallic anions in polar solutions include the quaternary ammonium compounds such as trimethyl-n-octylammonium chloride, trimethyl-n-decylammonium chloride, trimethyl-n-dodecylammonium chloride, trimethyl-n-octadecylammonium bromide, triethyl-n-hexadecylammonium iodide; mixtures of quaternary salts derived from tallow fatty acids, from cottonseed oil fatty acids, from soybean oil fatty acids and coconut oil fatty acids, from mixtures of fatty acids derived from tallow, corn oil, soybean oil, coconut oil; alkyl amines such as diamylamine, didodecylamine, n-decylamine, n-tetradecylamine, tri-n-octadecylamine, n-octadecylamine and mixtures of amines; and miscellaneous collectors such as ammonium phenylnitrosohydroxylamine, 1-n-dodecylpyridinium iodide, octadecyl beta hydroxyethyl morpholinium bromide, beta stearamidophenyl trimethylammonium methylsulfate, octadecyl pyridinium iodide, octadecyl alpha picolinium bromide, hexadecyl quinolinium bromide, decylstyrylpyridinium chloride, dodecylpyridinium phenylsulfonate, dimethyldodecylphenylammonium phenylsulfonate, 2-mercaptobenzothiazole derivatives, various imidazoline and imidazolidine derivatives and dimethyl-n-hexadecylbenzylammonium chloride.

Anionic collectors are of two types: the oxhydryl compounds, where a metal or hydrogen is connected to the hydrocarbon element of the collector through an oxygen atom, and the sulfhydryl type where the connection is made through a sulfur atom. The oxhydryl collectors include carboxylates, acid alkylsulfates, sulfonates and phosphates and phosphonates. The sulfhydryl compounds include mercaptans, thiocarbonates (xanthates), thioureas and dithiophosphates. Examples of anionic collectors include the acids and sodium, potassium or ammonium salts of rosin, the tall oils and animal and vegetable oils; naphthenic acids; sodium-n-octylsulfate; potassium-n-dodecylsulfate; the ammonium salt of n-dodecyldiethyleneglycolsulfate; the sodium salt of crude or refined petroleum sulfonic acid; beta-phenylpropionic acid; pelargonic acid; mixtures of acids derived from linseed oil, soybean oil, palm oil, corn oil and cottonseed oil; monosodium α-sulfopalmitate; disodium α-sulfostearate, 1,3-diphenyl-2-thiourea and thiocarbanilide. The above-described examples of cationic and anionic collectors are but a few of the many collectors which are known to be commercially practicable and which are used in flotation procedures.

The number of carbon atoms in the aerophilic portion or portions of the collector molecule required to impart desired aerophilic properties to the collector varies with the type of collector. Generally from 5 to about 24 and preferably from 8 to 22 carbon atoms are required in at least one aerophilic portion of the collector molecule. My preferred cationic and anionic collectors are derived from plant and animal triglycerides, preferably vegetable or marine animal triglycerides. These glycerides can be hydrolyzed to free their fatty acids which can then be utilized as anionic collectors per se, or which can be converted to ammonium or alkali metal salts for similar purposes. When a cationic collector is desired, the fatty acids are converted to amines, nitriles or quaternary salts by known means. It is also preferred that the hydrocarbon chains of these collectors contain carbon to carbon unsaturation. Where quaternary ammonium collectors, diamine collectors or triamine collectors are utilized, it is especially preferred that the collectors contain at least 1 hydrocarbon radical containing from 8–22 carbon atoms.

The term "insoluble reaction products" and similar terms are used throughout my specification. The term insoluble does not mean that the "solubility" is an equilibrium between the ions in solution and a solid ionic crystal, rather it is intended that the term encompass instances wherein the reaction product is composed of oppositely charged ions which are not independent as they have lost some entropy. Thus, the term applies to products adsorbed at the solvent-bubble interface, i.e. the unitary product molecules are no longer randomly dispersed throughout the solution but are, in a major proportion, localized at the solvent-bubble interface. The products at the interface may be thought of as crystals containing only one molecule of product. As these crystals are forced closer together in the draining froth, they form a scum which is highly insoluble rather than larger crystals.

The insolubility of the reaction products, insolubility being defined in terms of the preceding paragraph, formed in my process determines, to some extent, the efficiency of the process. A very high percentage of the total metal ion content can be rapidly removed from solution if the reaction product is highly insoluble while more soluble reaction products can only be removed to the extent that they are adsorbed and removed in the froth.

The rate of collection of the ions in solution can often be visually determined as the ionic solutions often change colors as the ions are removed. Thus, solutions containing blue copper ions or copper complex ions or yellow xanthate ions become progressively more clear and finally water white as the ions are removed.

As previously indicated the pH of the solutions determines, to some extent, the operablity of the process. This is because metal salts are soluble to a varying extent in any solution. This fact has been known for years and chemical metal separation and qualitative analytical procedures are often based on this physical phenomenon. Thus uranium complex anion reaction products are soluble at pH 3.9 and insoluble at pH 5.1 (Example XII below) when one collector is utilized and insoluble at a pH of 2.0 when another collector is utilized (Example XI below) while being soluble at pH's below 2.0. This phenomenon can also be utilized to separate one metal ion from others in solution where the solubilities vary to some extend at a particular pH.

To be useful in my process the ion solvent must dissolve the ion to be concentrated and the collector ion and must be polar to the extent that the metals and collectors ionize sufficiently for the ion to be collected to interact with the collector ion of opposite charge to form a reaction product which is insoluble in the solvent and bubble medium. Solvents which I have found to be useful in my process include water, anhydrous liquid ammonia, anhydrous lower alkyl amines, lower nitroalkanes, anhydrous lower aliphatic alcohols and acids, lower liquid alkyl chlorides such as methylene chloride and anhydrous lower aliphatic ketones and ethers. I prefer to use water as a solvent in my process.

The concentration of the collector in the solvent is one of several variables which determines the efficiency of my process. Generally, collectors have soap-like qualities and tend to form micelles in the solution when their concentration is increased to what is called the critical micelle concentration. If micelles are present in the solution to any great extent, a colloidal solution or sol will be formed which will hold the ion to be removed in the solution. In such cases, it will not be possible for the rising bubbles to collect a large portion of the metal ions and the efficiency of my process will be considerably reduced.

The critical micelle concentration is thought to depend upon many variables such as the pH of the solution; the temperature of the solution, which should be below the melting point of the reaction product; the ionic strength of the solution and the age of the collector solution. Generally, the critical micelle concentration of collectors ranges from about 0.1 to about 0.001 mole in water solution. For example, the critical micelle concentration of potassium laurate in water is about 0.02 mole while the critical micelle concentration of potassium myristate in water is 0.006 mole. Translated into grams, a concentration of 1.5 grams per liter of potassium myristate or about 0.019 gram per liter of sodium cetyl sulfate in water would approach the critical micelle concentration.

If excessive collector is dissolved in the solvent and micelles form so that recovery is poor or the process totally inoperative, a very high dilution of the solution with additional solvent will sometimes destroy the micelles and subsequently flotation may take place.

The age and prior history of the collector also affect the efficiency of my process. For example, my experiments on the quantitative recovery of cobalticyanide ions from aqueous solutions at concentrations of 1 mg./liter have demonstrated that the cationic collectors were sometimes as low as 10% stoichiometrically efficient.

I can overcome this difficulty to some extent by formulating fresh solutions of collector ions in polar vehicles such as ethanol and propanol, in which the collector has a high critical micelle concentration and introducting the collector solution into the solvent from which the ion is to be recovered. Efficiency is further improved if a collector solution is formulated in a non-polar solvent, such as petroleum ether, ethyl acetate, or kerosene; the solvent removed; the collector dissolved in a polar solvent and the resulting solution immediately introduced into the solution from which the ions are to be collected.

As mentioned, I prefer to add dilute solutions of a collector in a polar solvent, having, when ionized, a charge opposite to the charge of the metal ion to be collected to a solution of metal ions at such a rate that substantially no micelle formation occurs and at a rate such that substantially all micelles in the added soap solution are broken up. As the collector is added to the solution, bubbles are passed through the mixture to carry the adsorbed molecules of reaction product to the surface of the solvent where they can be collected or removed by usual procedures.

The rate of collector addition is determined by, among other things, the metal ion concentration and the critical micelle concentration. Where the metal ion concentration is low, several equivalent portions of collector may be added to the solution to effect a rapid concentration of the metal ion without exceeding the critical micelle concentration of the collector.

The amount of collector utilized in my process depends upon a number of factors including the number of reactive radicals on the collector molecules, the valence of the ion being collected and the pH of the solution. I have recovered 0.1 mg./liter aqueous solutions of cobalticyanide anions at collector concentrations of about $10^{-5}$–$10^{-6}$ M, and 0.1 mg./liter aqueous solutions of copper ions at collector concentrations of $10^{-5}$ M. This is possible because the metal ions apparently polymerize at appproximately neutral pH's (6–7) and much less than the stoichiometrically equivalent amounts of collector is required to recover a given amount of metal ion. As can be seen, the range of amounts of collector required to collect a given amount of ion is great. I prefer to utilize an amount of collector ranging from about 0.001 to 10 equivalents of collector/equivalent of ion. A still more preferable range of equivalents is 0.1–10 equivalents of collector/equivalent of ion. Still more preferable is the utilization of stoichiometrically equivalent amounts of collector/equivalent of ion to be collected.

The reaction products formed when the above-identified collectors are contacted are removed from solution by flotation, i.e. are removed from solution by means of substantially nonreactive gaseous bubbles. Useful bubble materials include gaseous hydrocarbons such as methane, ethane and butane; gaseous halogenated hydrocarbons such as the Freons; and gases such as air, carbon dioxide, nitrogen and argon. I prefer to utilize air to remove insoluble reaction products from the solvents used in the ion recovery process of my invention.

In polar solutions, the collector ions apparently concentrate at the interface between the solvent and the interior of the bubble. For this reason, it is preferable to utilize the smallest possible bubbles and to have the longest possible bubble path to the surface in order to insure the greatest amount of metal ion collection possible. In small reactors it is possible to decrease the rate of bubble rise and thereby increase collection efficiency by imparting a counter-current movement to the solvent.

The volume of the bubble fluid is not critical and varies widely with the shape of the solvent container, the solvent and the average individual bubble diameter. However, care should be taken that the volume of the bubble fluid or the size of the bubble are not such so that they will unduly disturb the surface of the solvent. As previously stated, the collector ions tend to congregate at the solvent bubble interface and rise to the surface with the bubbles. If the bubbles are lifted from the surface by following bubbles a foam is produced in which the insoluble reaction products, metal soaps, tend to agglomerate. This foam is easily removed. Hower, if the bubbles are broken to any great extent by turbulence, a relatively high soap concentration will be present near the surface of the water, which may cause the agglomerating insoluble soap molecules to form colloidal solutions, thus preventing them from being recovered.

The rate of bubble flow can be controlled by decreasing the total bubble volume as the turbidity of the water at the surface of the solvent increases. If there is no turbidity near the surface of the water, colloidal solutions are not being formed and the flow rate of the bubble fluid can be increased to a point just below the volume which tends to form turbid colloids near the surface of the fluid. The formation of turbid colloidal solutions reduces the efficiency of my process and is to be avoided. I prefer to maintain the surface of the liquid in a quiescent state; that is, a state of reduced turbulence where the rising bubbles remain substantially intact when they break the surface of the liquid to the extent that no great amounts of colloidal solution is formed. The bubble flow rate, or total volume of bubble fluid, can, as indicated before, be adjusted by visual or mechanical determinations of the turbidity of the solutions.

The insoluble reaction products formed in my process can be removed from the surface of the liquid, as a scum or froth depending whether excessive collector is utilized, by means of wipers which skim the insoluble reaction product from the liquid surface into a suitable collector. Alternately, an air current may be utilized to blow the froth into a collector. The bubbles may also be collected by flowing a small amount of surface solvent over a weir and through filters to remove the floating froth. Means for removing froths and scums are well known in the ore flotation art and can be equally well applied to my process.

Once concentrated on the surface and removed, the insoluble reaction products can be handled in several ways, depending upon the cost of the recovered element relative to the cost of the collector. If the recovered ion is much more valuable than the collector, there may be no need to recover the collector and the insoluble reaction product can be ignited and the inorganic material recovered, either as a metal in the case of noble metals, or as the mineral oxide.

In cases where the cost of the reagent is important relative to the cost of the metal being recovered, it is possible to devise schemes for the recovery of the reagent, especially if an insoluble compound of the metal can be formed. For example, uranium soap collected using a cationic quaternary ammonium soap can be treated with an alcoholic solution of an alkali such as potassium or calcium hydroxide. On triturating and standing for a while, an insoluble salt of uranium, either the potassium or calcium uranate is formed, while the soap remains in the solution as a quaternary ammonium hydroxide. This soap, on treatment with an appropriate acid, regenerates the original reagent in an alcoholic solution which can be preconditioned in non-polar solvents for a fresh collection.

Water and air are used as the solvent and bubble medium in the preferred embodiment of my invention. I will further discuss my invention in relationship to this preferred embodiment though my remarks are generally applicable to all embodiments of my invention.

The efficiency and selectivity of my process is determined by many variables including the concentration and ionic strength of the collector, the quiescence of the surface of the solvent or bubble medium, the solubility and ionic strength of the metal ions, the solubility of the reaction products of the metal ion and the collector and the pH of the solution. The collector ions have electrical charges which range from relatively weak to relatively strong, depending upon such factors as the extent of solvation and the electronegativity of the rest of molecule. The strength of the charge, among other things, tends to govern, to some extent, the rate of reaction between the collector ions and the ions to be collected. This fact can be utilized to aid in separation of one ion from others in the solution. For example, gold is usually recovered by leaching gold containing ores with potassium cyanide. The tailings contain uranium and traces of cobalt. Generally, the uranium is leached out of the tailings with dilute sulfuric acid in the presence of pyrolusite and adsorbed on ion exchange resins. An acid stable cobalticyanide is produced in the sulfuric acid leach and, if passed through the ion exchange resins, poisons the resins to the extent that they can no longer be used and must be discarded. Thus a minute amount of cobalticyanide, usually about 1 mg. per liter of solution, adds considerably to the cost of uranium recovery. I have found that I can remove the cobalticyanide by contacting the cobalticyanide with a strongly cationic collector and floating off the insoluble product thus formed. This is due to the fact that the cobalticyanides are highly anionic and react readily with the strongly cationic collector while the weakly anionic uranyl sulfate ions react to a lesser extent with the collector.

The solubility of the insoluble reaction products depends upon the branching and chain length of the hydrophobic (aerophilic) chain. This fact can be utilized to remove one cation by flotation while another cation remains in solution. Thus, strontium does not appear to be floated from aqueous solution by the palmitate ion, but is floated by the stearate ion. On the other hand, copper is floated easily by the palmitate ion. Similarly, the metal ions can be complexed to change their charge and the resulting solubility of the product formed. This is particularly true of the alkali metals which are collected as silicates and similar ions. For instance, the quaternary ammonium collectors are soluble in acid solutions, while the reaction products of those of the metals which form anionic complexes are insoluble and are stable at the same acid conditions and can be separated from unwanted cations which may be present and which remain in solution.

Should the ion to be collected exist only as a cation, the situation is complicated by the fact that the collector has to be anionic and such collectors are, for the most part, salts of weak acids and therefore tend to hydrolyze to the insoluble fatty acids in acid solution though the fatty acids could be made into stronger acids by adding electronegative substances such as chlorine or —$SO_3H$ to the long chain hydrocarbon. Generally the long chain alkyl sulfonates are sufficiently strong acids to be usable in dilute acid solutions and must be utilized at pH's where fatty acids are insoluble. In very dilute solutions, it is possible to keep ions, such as copper ions, in solutions at nearly neutral pH's and, under these conditions, even the weakly acidic fatty acids can be utilized.

I prefer to recover uranyl sulfate, vanadate, molybdate, chloroplatinate, aurichloride, fluoroberyllate, silicic acid, polythionate, chromates and ferrocyanide anions from aqueous solutions with dodecylquaternary ammonium, ammonium chloride and laurylpyridinium chloride collectors and to recover copper, cobalt and nickel ammonium complexes, together with thoria ions with an alkali metal laurate soap. To recover detergents from aqueous solutions, I prefer to utilize polyvalent metal cations such as aluminum and iron.

The following examples more fully illustrate my invention, but it is not intended that my invention be restricted to the exact steps, concentrations, reagents or ions collected. Rather, it is intended that all equivalents be included within the scope of my invention as claimed.

*Example I*

One liter of solution from a uranium extract plant containing 1 gram of uranium/liter as uranyl sulfate, was diluted with water to two liters in a narrow five liter beaker. In such a solution the uranium is complexed to be in an anionic form. Ammonia was added until precipitation of iron just began, and the solution was acidified with dilute sulfuric acid until the precipitate just redissolved. Air was bubbled into the bottom of the solution through a sintered glass distributor and a 25% solution of didodecyl dimethyl ammonium bromide in ethyl alcohol, containing some propyl alcohol, was added 0.1 ml. at a time. The solution became turbid and a foam collected. As the bubbles coalesced and broke, the foam became cream to yellow in color, this being characteristic for uranium. The foam was separated from time to time by decanting off the liquid, and after about five liters of foam had been produced, requiring about 20/ml. of the quaternary ammonium solution, the solution, on analysis, showed that 97% of the uranium had been removed. The foam was treated with an alcoholic solution of potassium hydroxide and immediately broke. The clots were broken up by rubbing and a precipitate of potassium uranate was formed. This was almost free from iron, but contained a little manganese, which is present in considerable amounts in the solution treated. The reagent remained in the alcoholic solution and on acidification could be used again.

*Example II*

Utilizing the general procedures outlined in Example I, a series of recoveries of various metal complex anions were made at slightly acid pH's (5–6) utilizing various collectors as are set out in the following table:

| Complex metal anion | Collector* | Froth | |
|---|---|---|---|
| | | Amount | Color |
| Uranylsulfate | A | Copious | Light yellow. |
| Do | B | do | Do. |
| Chloroplatinic | A | Moderate | Do. |
| Do | B | do | Do. |
| Cobalticyanide | A | do | Do. |
| Do | B | do | Do. |
| Vanadate | A | do | Do. |
| Do | B | do | Do. |
| Molybdate | A | do | Do. |
| Do | B | do | Do. |
| Auricyanide | A | do | Do. |
| Do | B | do | Do. |
| Ferrocyanide | A | do | Do. |
| Do | B | do | Do. |

*Collector A is lauryl pyridinium chloride; B is didodecyl dimethyl ammonium bromide.

*Example III*

The results of Example II showed that the ferrocyanide ion formed an insoluble scum very readily. To reduce stream pollution, the reverse procedure can be carried out utilizing the ferrocyanide anion to remove cationic detergents from water solution. The detergent and ferrocyanide can then be broken up for recovery by the method described in Example I.

*Example IV*

A liter of solution, containing about 3 mg. of cobalt as the cobalticyanide was placed in a separating funnel. 0.1 ml. of 25% solution of didodecyl dimethyl ammonium bromide in ethyl alcohol was added, the solution was adjusted until just acid to methyl red, and shaken welll. A foam was produced. After standing for 10 minutes, the liquid was run off, and the foam left in the funnel. A few ml. of ethyl acetate was added. This broke the foam and dissolved the soap. The solution was placed in a silica dish, the ethyl acetate burnt off and the soap ignited. This converted the complex cobalticyanide to cationic cobalt which could be analyzed colorimetrically.

*Example V*

To a liter of solution of copper sulfate, containing about 1 g. of $Cu^{++}$, just enough ammonia was added to redissolve the precipitated copper hydroxide in the form of the cuprammonium complex. Air was bubbled through and the commercial preparation of the sodium salt of sulfated fatty alcohols known as Teepols was slowly added to the solution 1 ml. at a time. The froth gradually became greenish and a scum of the same color ensued. The experiment was continued until the deep blue color of the cuprammonium ion had almost disappeared. This is evidence of a very low concentration of copper. The scum was established to be a copper soap.

*Example VI*

Utilizing the procedure of Example V, a series of cations were collected using various collectors as set out in the table below:

| Ammonium complex anion | Collector | Froth | |
|---|---|---|---|
| | | Amount | Color |
| Copper | Potassium palmitate | Scum | Greenish |
| Nickel | do | do | Do. |
| Do | Teepol | Moderate | Do. |
| Cobalt | do | do | Do. |
| Do | Potassium palmitate | Scum | Do. |

Example VII

A recovery apparatus was prepared consisting of an 8.4 centimeter diameter glass funnel, 7.6 centimeters deep and having an 8.4 centimeter diameter sintered glass bottom plate. The funnel was fitted with a rubber collar which was shaped to provide a run-off trough to facilitate collection of the scum bearing foam. Air was passed, when desired, through the bottom of the funnel at a rate sufficient to insure a well distributed column of bubbles and at a rate insufficient to cause undue turbulence at the surface of the solution.

A complex copper anion was made up by adding three drops of concentrated ammonium hydroxide to 20 ml. of 3 grams per liter copper sulfate solution to complex the copper ion. This complex was then added to 300 ml. of water to form the test solution. A collector solution was prepared by dissolving in 8–10 ml. of ethanol three drops of Neo-Fat 265 (a distilled mixture of fatty acids obtained by hydrolysis of cocoa oil) and boiling the solution for one minute over an open flame.

The solution, pH 9.3, was poured into the funnel and the air flow and collector addition started. A moderate blue copper soap scum rose to the surface of the solution and was removed with a spatula until no more blue color appeared in the froth. An additional two drops of concentrated ammonium hydroxide caused the formation of more blue froth. The froth bed collapsed at the end of the 22 minute collection period and the final solution was found to have a pH of 8.7.

Example VIII

Following the procedures of Example VII, similar copper ion extractions were carried out under conditions described in the following table with the described results:

| Collector | Solution, pH | Froth | |
|---|---|---|---|
| | | Amount | Color |
| Monosodium α-sulfo palmitate | 9.0 | Voluminous | Blue. |
| Disodium α-sulfo stearate | | | Do. |
| Neo-Fat 265 | 4.5 | Moderate | Do. |
| Armeen CD [1] | 8.9 | do | Do. |
| Armeen CD [1] | 10.5 | | Violet. |
| Neo-Fat 18-61 [2] | 8.1 | Voluminous | Blue. |

[1] A mixture of C-8-18 fatty acids.
[2] A mixture of stearic and palmitic acids.

Example IX

Utilizing the equipment of Example VII, a dilute solution of ferrocyanide ion was collected. The ferrocyanide solution was made up by adding 4–5 ml. of 5% potassium ferrocyanide to 300 ml. of water in the separator apparatus. A very faint yellow color resulted in the solution. The solution was then made acid with hydrochloric acid. A small amount, approximately 0.1 gram, of lauryl pyridinium chloride was dissolved in 5–10 ml. of ethanol and boiled for one minute. Air was introduced into the cell and the reagent added slowly. A yellow scrum appeared on the froth bed and continued to form at the end of the test. At the end of the test period, the solution had attained a pH of 3.0.

Example X

Following the procedure of Example IX, other collectors were utilized to remove the ferrocyanide anion from solution. The reagent utilized, the pH of the solution treated and the amount and color of the froth collected are set out in the following table:

| Collector | Solution, pH | Froth | |
|---|---|---|---|
| | | Amount | Color |
| Armeen CD[1] (chloride salt) | 1.9 | Moderate | Yellow. |
| Arquad C[2] | 3.1 | do | White. |
| Arquad 2 C[3] | 2.9 | | Violet.[9] |
| Arquad T-2 C[4] | 3.0 | | Violet.[9] |
| Arquad 12[5] | 3.0 | | Yellow-violet. |
| Armeen C (chloride salt)[6] | 1.6 | | Cream-pink. |
| Armeen S (chloride salt)[7] | 1.9 | Light | Do. |
| Armeen T (chloride salt)[8] | 1.7 | | Do. |

[1] A mixture of primary amines containing 8–18 carbon atoms.
[2] A mixture of trimethyl alkyl ammonium chlorides containing one alkyl having 8–18 carbon atoms.
[3] Mixture of dialkyl dimethyl ammonium chloride. The alkyl radicals having 8–18 carbon atoms.
[4] Mixtures of mono and dialkyl quaternary ammonium chlorides, the alkyl radicals having 8–18 carbon atoms.
[5] Mixtures of alkyl trimethyl ammonium chlorides sold by Armour and Company, the alkyl radicals having 12–14 carbon atoms.
[6] Mixtures of primary amines of footnote 1.
[7] Mixtures of octadecyl and octadecenyl primary amines.
[8] Mixtures of C16–18 primary amines containing about 2% C14 primary amines.
[9] Color may be due to traces of iron produced Prussian blue.

Example XI

A small amount of uranium acetate salt was dissolved in distilled water and made acid with hydrochloric acid. This was added to 300 ml. of water and poured into the separatory apparatus of Example VII. A small amount of phosphoric acid was added to the solution to simulate the uranium content in the Florida Phosphate Industry's mill waters. Two or three drops of Arquad 12 (utilized in Example X) was dissolved in ethanol and boiled for one minute. Air flow and collector addition was started. No yellow scum was observed and a few drops of ammonium hydroxide was added. Immediately a yellow scum appeared on the froth bed. The final pH of the solution was 2.0 and it is thought that the original solution may have been too acid for the formation of the insoluble uranyl quaternary reaction product.

Example XII

Further uranium ion recoveries were obtained with various collectors. The collector, solution pH and the amount and color of the froth are set out in the table below:

| Collector | Solution, pH | Froth | |
|---|---|---|---|
| | | Amount | Color |
| Lauryl pyridinium chloride | 2.8 | Moderate | Light yellow. |
| Armeen CD (chloride salt) | 3.0 | Voluminous | Yellow. |
| Armeen DMCD [1] | 1.8 | do | Do. |
| Arquad 12 | 2.0 | Moderate | Do. |
| Arquad C | 3.7 | do | Do. |
| Arquad 2 C | 3.9 | No recovery | |
| Arquad 2 C | 5.1 | Voluminous | Yellow. |
| Arquad 12 | 4.3 | Light | Do. |

[1] Distilled dimethyl cocoa trimaines.

Example XIII

A small amount of nickel nitrate salt was dissolved in distilled water in a test tube made basic with ammonium hydroxide. This complex was added to 300 ml. of water in the separatory apparatus of Example VII. A collector solution was prepared by adding two or three drops of Armeen C to 10 ml. of methanol and boiling the solution for one minute. Introduction and reagent introduction were begun and a light green scum formed which was removed with a spatula. The pH of the final solution was 8.8.

Example XIV

A small amount of cobalt salt was dissolved in 300 ml. of water and poured into the separatory apparatus of Example VII. Several drops of Neo-Fat 265 were disolved in ethanol and a few drops of alcoholic potassium hydroxide added to form the fatty acid soap. The reaction mixture was heated over an open flame for one minute at boiling temperature. Air was introduced into the separatory apparatus and the reagent mixture added. At first no scum was formed and the pH of the solution was found to be 7.0. A few drops of ammonium hydroxide were added and immediately a blue scum formed which gradually changed to a green color. The solution was made acid with sulfuric acid and all scum formation ceased, the solution turning brown. Again, ammonium hydroxide was added until the solution was basic and a green scum reformed. The final pH of the solution was 9.1.

Example XV

To remove the calcium from pure Chicago tap water, 300 ml. of the water was placed in the separatory apparatus with a collector, made by dissolving a few drops of Neo-Fat 18–61 (a mixture of stearic and palmitic acids) in ethanol and reacting the fatty acids with potassium hydroxide in an alcoholic solution to form the desired fatty acid soap. After the addition of the collector and initiation of bubble flow, a light froth appeared containing the white calcium soap scum.

Example XVI

Following the procedure of Example V, sodium dodecyl phosphate was utilized to collect complex ions of ammonia with copper, nickel and cobalt.

Example XVII

A unit for the recovery of metals from sea water can economically be made from a 100 meter pipe and an anchored floating weir. The pipe would be adapted to provide a steady flow of air bubbles and collector chosen according to product desired throughout its entire length. The pipe should be submerged to about 100 meters depth in a non-turbulent area having a water current of about three knots. The floating weir would be constructed so as to encompass the area of bubble emergence and to catch the floating scum regardless of the direction of wind or water flow. At three knots the volume of water passing the curtain of bubbles in one hour is about $55 \times 10^6$ cubic meters. That volume of sea water contains metals in quantities of the order of:

| | |
|---|---:|
| Copper _____kg__ | 50–500 |
| Lead _____kg__ | 220 |
| Zinc _____kg__ | 275 |
| Cerium _____kg__ | 20 |
| Silver _____kg__ | 16 |
| Iron _____kg__ | 200 |
| Molybdenum _____kg__ | 27 |
| Nickel _____kg__ | 5 |
| Uranium _____kg__ | 150 |
| Mercury _____kg__ | 1.5 |
| Gold _____grams__ | 300 |
| Aluminum _____kg__ | 27,500 |

From the above, it is readily aparent that my process is of commercial interest, especially in light of the fact that the collectors can be recovered and recycled to form a continuous process.

Example XIX

To one liter of uranium pregnant solution, stated to contain less than 1 mg. of cobalt as cobalticyanide, 4 ml. of solution containing 15 mg./ml. of didodecyl dimethyl ammonium chloride dissolved in isopropyl alcohol was added in 2 ml. quantities and air was bubbled in for 1 hour. The froth was collected and ignited and found to contain 0.3 mg. of cobalt. There was also a quantity of silica but no uranium. Further addition of 2 ml. quantities of collector produced no more cobalt, but some silica until a total of 10 ml. had been added, when uranium started to be collected. This confirms the selectivity of the process, as the uranium concentration in the pregnant solution is about 1 g. per liter. This also illustrates a useful application as a clarifier and remover of silica, which not only causes filtration difficulties if present in appreciable quantities, but is also an ion-exchange poison, being adsorbed in preference to uranium.

Example XX

To a solution of potassium ferrocyanide containing 1 mg. of iron in 1 liter of solution at pH 2, there was added the stoichiometric amount of didodecyl dimethyl ammonium chloride, prepared by evaporating an ethyl acetate solution to dryness, and then dissolving the residue in 1 ml. of propyl alcohol. After bubbling in air for 1 hour, the scum was collected and ignited. Analysis showed 0.8 mg. of iron removed.

Example XXI

To recover nickelous, cobaltic, ferric and lead ions from solution, ethyl xanthate is slowly added to an aqueous solution of the desired ion at a neutral or acid pH of about 5.9. Methane, carbon dioxide or nitrogen is bubbled through the solution to collect the insoluble product as in previous examples.

Example XXII

To recover the small amount of copper remaining in ore gangue after flotation, reground tailings are water washed and passed, with agitation, into a flotation chamber containing fresh water. The water is made acidic with sulfuric acid and diethylxanthate is introduced, in an ethanol concentrate, at a rate which maintains the collector below the critical micelle concentration. Air is bubbled into the flotation chamber and the froth recovered over a period of time as the copper ions tend to be floated prior to the copper particles.

Many processes are known for ionizing metals which are floated with great difficulty. It will be apparent to one skilled in the art that superior ion collection coupled with the small amount of flotation taking place with these minerals can convert an otherwise uneconomical process to a more economical process.

It is apparent from the specification and the above examples that many species of the process of my invention can be utilized in either metal or collector recovery processes. It is manifestly impossible for the applicant to comprehend within his disclosure all of these species. To formulate a set of specific conditions for the recovery of a specific ion requires chemical knowledge and skill, but such knowledge on the part of the flotation chemical engineer is that of the architect who, when required to design a house, prescribes the proper materials and dimensions thereof. From his knowledge, as a chemist or chemical engineer, of the materials available and the known solubilities of materials and from his knowledge of the theories of solubility based on known solubilities, he will deduce with confidence the applicability of various materials to my process and will be able to fit unmentioned collector and metal ions into my process by routine testing of the reaction product solubilities at various pH's and concentrations. Analogously, in the construction of a house, the architect can easily test the load bearing capacity of new and little used materials for a particular usage and can reject certain materials as being inoperative, impractical or uneconomic for his purposes. It is safe to assume that no one would want to carry out a useless specie of my invention or that anyone will be misled because it is possible to misapply the teachings of my invention.

Now, having described my invention, what I claim is:

1. A process for the recovery of inorganic ions from a polar solution thereof by a technique wherein a unique floatable reaction product is formed and separated by froth flotation comprising contacting said inorganic ions while in said poplar solution with an oppositely-charged, ion-producing, surface-active collector having at least one hydrophilic and one aerophilic center of activity, said collector being selected from the group consisting of alkyl, aryl, arylalkylamines and the corresponding amine and quaternary halogen salts, and a triglyceride derivative selected from the group consisting of plant and animal triglycerides having from 5 to 24 carbon atoms in each of its aerophilic centers of activity at collector concentrations below the critical micelle concentration of said collector, to form a reaction product, said reaction product being of a monomolecular nature capable of adsorption at the interface of an air bubble by reason of the aerophilic activity of said collector, buoying the reaction product with air bubbles to form a froth on the surface of the solution while maintaining said surface substantially quiescent, and recovering the reaction product from the froth by removal of the froth from solution.

2. The process of claim 1 in which the inorganic ion is a metal ion.

3. The process of claim 1 in which the inorganic ion is an anionic complex of silicate and metal.

4. The process of claim 1 in which the inorganic ion is a complex ion of cyanide and metal.

5. The process of claim 1 in which the inorganic ion is a complex of ammonia and metal.

6. The process of claim 1 in which the inorganic ion is a complex ion of fluorine and metal.

7. A process for the recovery of inorganic ions from a polar solution thereof by a technique wherein a unique floatable reaction product is formed and separated by froth flotation comprising contacting said inorganic ions while in said polar solution with an oppositely-charged, ion-producing, surface-active collector having at least one hydrophilic and one aerophilic center of activity, said collector being selected from the group consisting of alkyl, aryl, arylalkylamines and the corresponding amine and quaternary halogen salts, and a triglyceride derivative selected from the group consisting of plant and animal triglycerides having from 5 to 24 carbon atoms in each of its aerophilic centers of activity at collector concentrations below the critical micelle concentration of said collector, to form a reaction product, said reaction product being of a monomolecular nature capable of adsorption at the interface of an air bubble by reason of the aerophilic activity of said collector, buoying the reaction product with air bubbles to form a froth on the surface of the solution while maintaining said surface substantially quiescent, removing the froth, and recovering the reaction product therefrom.

References Cited by the Examiner

UNITED STATES PATENTS

| | | | |
|---|---|---|---|
| 1,619,036 | 3/27 | Ravnestad. | |
| 2,395,866 | 3/46 | Gutzeit | 209—166 |
| 2,414,199 | 1/47 | Gutzeit | 209—166 |
| 2,570,120 | 10/51 | Handley et al. | |
| 2,610,738 | 9/52 | Cuthbertson. | |
| 2,647,629 | 9/53 | Veltman. | |
| 2,697,518 | 12/54 | Bennett et al. | 209—166 |
| 2,750,254 | 6/56 | Blake | 23—14.5 |
| 2,820,759 | 1/58 | Monet. | |
| 2,838,369 | 6/58 | Gauden et al. | 23—14.5 |
| 2,869,979 | 1/59 | Grinstead | 23—14.5 |
| 2,869,980 | 1/59 | Grinstead | 23—14.5 |
| 2,870,207 | 1/59 | Niderhauser. | |
| 2,902,503 | 9/59 | Neville | 23—14.5 X |
| 2,953,569 | 9/60 | Last et al. | |

OTHER REFERENCES

"Nuclear Science Abstracts," vol. 5, Abstract 1239 (1951), abstract cites Geigorov et al., "Kolloid Zhur.," vol. 11, pp. 390–394, November, December (1950).

Brown et al.: "The use of Amines as Extractants for Uranium From Acidic Sulfate Liquors," AECD–4142, U.S. Atomic Energy Comm., especially pp. 1–3, 21–25, 29–40, 73–74 and 95–98. May 27, 1954.

Gaudin: "Flotation," second edition, pp. 5, 182–190, 198–205, 217–222, 230, 231, 258–260, 333, 335, 347, 348 (1957).

CARL D. QUARFORTH, *Primary Examiner.*

ROGER L. CAMPBELL, LEON D. ROSDOL,
*Examiners.*